(12) United States Patent
Hatton et al.

(10) Patent No.: US 11,026,419 B2
(45) Date of Patent: Jun. 8, 2021

(54) SILVER- AND COPPER-CHELATING IONIC LIQUIDS, POLYMERS, AND GELS, AND USES THEREOF

(71) Applicant: Massachusetts Institute of Technology, Cambridge, MA (US)

(72) Inventors: T. Alan Hatton, Sudbury, MA (US); Timothy Kuan-Ta Lu, Cambridge, MA (US); Paul Brown, Boston, MA (US); Cesar de la Fuente Nunez, Somerville, MA (US); Sahag Voskian, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/349,800

(22) PCT Filed: Nov. 20, 2017

(86) PCT No.: PCT/US2017/062529
§ 371 (c)(1),
(2) Date: May 14, 2019

(87) PCT Pub. No.: WO2018/094317
PCT Pub. Date: May 24, 2018

(65) Prior Publication Data
US 2019/0327964 A1    Oct. 31, 2019

Related U.S. Application Data

(60) Provisional application No. 62/424,594, filed on Nov. 21, 2016.

(51) Int. Cl.
*A61K 9/00* (2006.01)
*A01N 33/04* (2006.01)
*A01N 25/02* (2006.01)
*A01N 37/18* (2006.01)
*A01N 59/20* (2006.01)

(52) U.S. Cl.
CPC ............. *A01N 33/04* (2013.01); *A01N 25/02* (2013.01); *A01N 37/18* (2013.01); *A01N 59/20* (2013.01)

(58) Field of Classification Search
CPC ...................................... A61N 33/04
See application file for complete search history.

(56) References Cited

U.S. PATENT DOCUMENTS

| 2008/0070966 A1 | 3/2008 | Elder et al. |
| 2011/0144079 A1 | 6/2011 | Earle et al. |
| 2011/0182951 A1 | 7/2011 | Burger et al. |

(Continued)

OTHER PUBLICATIONS

Iida et al. "Properties of ionic liquids containing silver(I) or protic alkylethylenediamine cations with a bis(trifluoromethanesulfonyl)amide anion," J Colloid Interf Sci, 356(2): 630-638 (2011).

(Continued)

*Primary Examiner* — Paul W Dickinson
(74) *Attorney, Agent, or Firm* — Foley Hoag LLP; Dana M. Gordon; Lawrence P. Tardibono

(57) ABSTRACT

Disclosed are methods of antimicrobial treatment using ionic liquids (ILs), IL complexes, polymers comprising ILs, and polymers comprising neutral ethylene diamine compounds. Also disclosed are novel IL complexes, polymers comprising ILs, and polymers comprising neutral ethylene diamine compounds.

19 Claims, 8 Drawing Sheets

Structure of [HHex][Tf$_2$N] complex with copper.

(56) References Cited

U.S. PATENT DOCUMENTS

2013/0059975 A1    3/2013   Lewandowski et al.
2014/0170238 A1    6/2014   Cliff et al.
2016/0100578 A1    4/2016   Ghandi et al.

OTHER PUBLICATIONS

International Search Report and Written Opinion for International Application No. PCT/US2017/062529 dated Jan. 22, 2018.
Takemura et al. "Solvation Structure of a Copper(II) Ion in Protic Ionic Liquids Comprising N-Hexylethylenediamine," Inorg Chem, 53(18): 9667-9678 (2014).

Structure of [HHex][Tf₂N] complex with copper.

SILVER- AND COPPER-CHELATING IONIC LIQUIDS, POLYMERS, AND GELS, AND USES THEREOF

RELATED APPLICATION

This application is a § 371 national stage application based on Patent Cooperation Treaty Application serial number PCT/US2017/062529, filed Nov. 20, 2017; which claims the benefit of priority to U.S. Provisional Patent Application Ser. No. 62/424,594, filed Nov. 21, 2016.

BACKGROUND

Recently the emergence of multi-drug resistant pathogens has sparked interested in new approaches to antimicrobial chemotherapy, beyond standard biocidal agents and antibiotics. The activity of heavy metals against biofilms has been studied extensively [1, 2]. Furthermore, Harrison et al. reported that the use of quaternary ammonium cations combined with Cu(II) anions had a synergistic bactericidal effect against *Pseudomonas aeruginosa* [3]. Silver has also been used for hundreds of years and been placed in many propriety formulations for the treatment of burns [4, 5], topical dressings for wound management [6], and employed in coatings for wound management [7]. In 2013, cationic ionic liquids (ILs) based on 1-methyl-n-alkylimidazolium and $[AgCl_2]^-$ or $[CuCl_4]^-$ anions were synthesized [8, 9]. ILs containing silver had been reported before but never tested for antimicrobial activity [10]. The incorporation of silver and copper anions into 1-methly-3-alkylimidazolium-cations improved antimicrobial activity; with longer alkyl chains demonstrating enhanced microbiological toxicity. This work has been patented [9] and focuses on quinolinium or isoquinolinium cationic species but failed to report polymerizable ionic liquids. This is thought to be due to the fact that the products would not form an ionic liquid. It should be noted that this is one of the few nanoparticle free approaches to using metals as antimicrobial agents (the exceptions being aqueous $AgNO_3$ solutions [11] or actual metal monolayers).

SUMMARY

Accordingly, new methods of antimicrobial treatment are needed. Disclosed herein are methods of antimicrobial treatment using ionic liquids (ILs), IL complexes, polymers comprising ILs, and polymers comprising neutral ethylene diamine compounds. Also disclosed are novel IL complexes, polymers comprising ILs, and polymers neutral ethylene diamine compounds.

DETAILED DESCRIPTION

This disclosure is based on new ionic liquids (ILs) and polymers that can chelate to metal ions and exhibit antimicrobial activity. The compounds are based on the ethylenediamine (EDA) functional group either modified into a charged ionic liquid or left as a neutral moiety, depending on the desired application. EDA and the IL analogues chelate heavy metals such as Cu and Ag, which have demonstrated antibacterial properties. In addition, when (4-Vinyl)benzylethylene-diamine (VBEDA) was attached to the EDA functional group a monomer was generated that could be (co-)polymerized, that could form spin-coated or grafted layers with antimicrobial activity suitable for surface coatings, or to generate sponges and thermoresponsive gels which could be incorporated into a whole host of materials. In particular, these compounds have been employed in flow cells.

Figure 1:
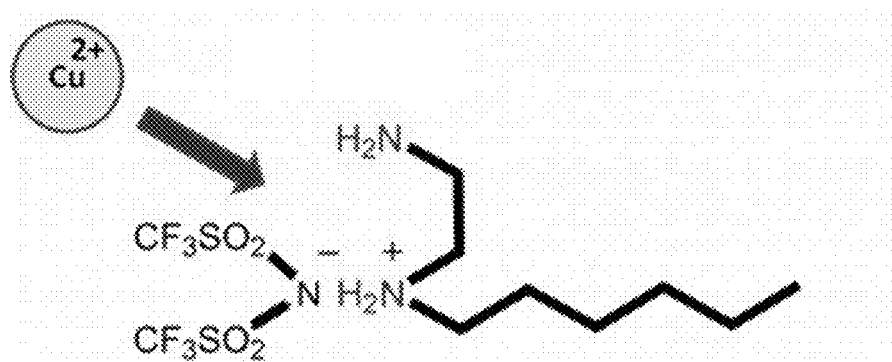
FIG. 1 shows copper binding to the ionic liquid N-hexylethylenediaminium bis(trifluoroethanesulfonyl)amide, [HHex][Tf$_2$N].

Disclosed herein is an ionic liquid that chelates metal ions and are not based on metal anions [10, 12, 13] (FIG. 1). The compounds bind to metal both in the IL form and the neutral EDA analogue. The ILs are highly tunable with effectively unlimited permutations (~$10^{18}$) available on the alkyl chain as well as through choice of anion. This controls both physicochemical properties such a solubility and melting point and also biological behavior. For example, it is well known that the longer alkyl chains (cationic surfactants) can have an additive effect to antibacterial properties [8] and this can be built into the IL design to enable synergistic antibacterial properties. It is also known that Ag has enhanced antibacterial properties over Cu [14]. However, fungi are relatively more susceptible to copper toxicity than bacteria and blends of ILs and mixed metal systems can be prepared for dual application.

Methods of Use

In one aspect, the present disclosure provides a method of antimicrobial treatment, comprising:

providing a sample comprising a plurality of microorganisms;

adding to the sample an ionic liquid mixture comprising an ionic liquid complex comprising an ionic liquid chelated to a metal cation;

thereby killing or inhibiting the growth of at least a portion of the plurality of microorganisms in the sample.

In another aspect, the present disclosure provides a method of antimicrobial treatment, comprising:

providing a sample comprising a plurality of microorganisms, wherein said microorganisms comprise a metal cation;

adding to the sample an ionic liquid, thereby killing or inhibiting the growth of at least a portion of the plurality of microorganisms in the sample.

In one aspect, the present disclosure provides a method of antimicrobial treatment, comprising:

providing a sample comprising a plurality of microorganisms;

adding to the sample a homopolymer comprised of a plurality of monomers comprising an ionic liquid complex, comprising an ionic liquid chelated to a metal cation;

thereby killing or inhibiting the growth of at least a portion of the plurality of microorganisms in the sample.

In another aspect, the present disclosure provides a method of antimicrobial treatment, comprising:

providing a sample comprising a plurality of microorganisms, wherein said microorganisms comprise a metal cation;

adding to the sample a homopolymer comprised of a plurality of monomers comprising an ionic liquid, thereby killing or inhibiting the growth of at least a portion of the plurality of microorganisms in the sample.

In still another aspect, the present disclosure provides a method of antimicrobial treatment, comprising:

providing a sample comprising a plurality of microorganisms;

adding to the sample a homopolymer comprised of a plurality of monomers comprising an ethylene diamine complex, comprising a neutral ethylene diamine compound chelated to a metal cation;

thereby killing or inhibiting the growth of at least a portion of the plurality of microorganisms in the sample.

In yet another aspect, the present disclosure provides a method of antimicrobial treatment, comprising:

providing a sample comprising a plurality of microorganisms, wherein said microorganisms comprise a metal cation;

adding to the sample a homopolymer comprised of a plurality of monomers comprising a neutral ethylene diamine compound;

thereby killing or inhibiting the growth of at least a portion of the plurality of microorganisms in the sample.

In another aspect, the present disclosure provides a method of antimicrobial treatment, comprising:

providing a sample comprising a plurality of microorganisms;

adding to the sample a polymer comprised of a plurality of first monomers selected from the group consisting of an acrylate, an acrylamide, an alkene, a silane, and a siloxane compound and a plurality of second monomers, wherein the second monomer comprises an ionic liquid complex, comprising an ionic liquid chelated to a metal cation;

thereby killing or inhibiting the growth of at least a portion of the plurality of microorganisms in the sample.

In a further aspect, the present disclosure provides a method of antimicrobial treatment, comprising:

providing a sample comprising a plurality of microorganisms, wherein said microorganisms comprise a metal cation;

adding to the sample a polymer comprised of a plurality of first monomers selected from the group consisting of an acrylate, an acrylamide, an alkene, a silane, and a siloxane compound and a plurality of second monomers, wherein the second monomer comprises an ionic liquid, thereby killing or inhibiting the growth of at least a portion of the plurality of microorganisms in the sample.

In one aspect, the present disclosure provides a method of antimicrobial treatment, comprising:

providing a sample comprising a plurality of microorganisms;

adding to the sample a polymer comprised of a plurality of first monomers selected from the group consisting of an acrylate, an acrylamide, an alkene, a silane, and a siloxane compound and a plurality of second monomers, wherein the second monomer comprises an ethylene diamine complex, comprising a neutral ethylene diamine compound chelated to a metal cation;

thereby killing or inhibiting the growth of at least a portion of the plurality of microorganisms in the sample.

In another aspect, the present disclosure provides a method of antimicrobial treatment, comprising:

providing a sample comprising a plurality of microorganisms, wherein said microorganisms comprise a metal cation;

adding to the sample a polymer comprised of a plurality of first monomers selected from the group consisting of an acrylate, an acrylamide, an alkene, a silane, and a siloxane compound and a plurality of second monomers, wherein the second monomer comprises a neutral ethylene diamine compound;

thereby killing or inhibiting the growth of at least a portion of the plurality of microorganisms in the sample.

In some embodiments of the polymers disclosed herein, the polymer is incorporated into an article. In some embodiments, for example, the article is selected from filters (e.g., hand-held water filters), membranes, packing materials (e.g., for foods, agriculture, paints, etc.), flow cells, filter gaskets, gloves, masks, garments, wound dressings, implants, catheters, and other medical devices. In some embodiments, the article is sterile.

In some embodiments of the polymers disclosed herein, the polymer further comprises a cellulose derivative.

In some embodiments of the polymers disclosed herein, the polymer forms a microemulsion, an emulsion, or a gel. In some embodiments, the polymer is thermoresponsive.

In some embodiments of the methods of antimicrobial treatment disclosed herein, the sample further comprises water.

In some embodiments of the above methods, the ionic liquid complex kills at least a portion of the plurality of microorganisms. In some embodiments of the above methods, at least a portion of the plurality of microorganisms is killed.

In some embodiments of the above methods, the ionic liquid complex inhibits the growth of at least a portion of the plurality of microorganisms. In some embodiments of the above methods, the growth of at least a portion of the plurality of microorganisms is inhibited.

In still another aspect, the present disclosure provides a method of preventing or suppressing microbial growth on a surface, comprising:

applying to the surface an ionic liquid mixture comprising an ionic liquid complex comprising an ionic liquid chelated to a metal cation;

thereby preventing or suppressing microbial growth on the surface.

In another aspect, the present disclosure provides a method of preventing or suppressing microbial growth on a surface, comprising:

applying to the surface an ionic liquid, thereby preventing or suppressing microbial growth on the surface.

In yet another aspect, the present disclosure provides a method of preventing or suppressing microbial growth on a surface, wherein the surface comprises a coating comprising a plurality of reactive moieties; comprising:

reacting the reactive moieties with an ionic liquid complex comprising an ionic liquid chelated to a metal cation, thereby preventing or suppressing microbial growth on the surface.

In still another aspect, the present disclosure provides a method of preventing or suppressing microbial growth on a surface, wherein the surface comprises a coating comprising a plurality of reactive moieties; comprising:

reacting the reactive moieties with an ionic liquid, thereby preventing or suppressing microbial growth on the surface.

In some embodiments of the methods disclosed herein, the ionic liquid mixture further comprises water. In some embodiments of the methods disclosed herein, the ionic liquid further comprises water.

In a further aspect, the present disclosure provides a method of preventing or suppressing microbial growth on a surface, wherein the surface comprises a coating comprising a plurality of reactive moieties; comprising:

reacting the reactive moieties with an ethylene diamine complex comprising a neutral ethylene diamine compound chelated to a metal cation, thereby preventing or suppressing microbial growth on the surface.

In another aspect, the present disclosure provides a method of preventing or suppressing microbial growth on a surface, wherein the surface comprises a coating comprising a plurality of reactive moieties; comprising:

reacting the reactive moieties with a neutral ethylene diamine compound, thereby preventing or suppressing microbial growth on the surface.

In some embodiments of the methods disclosed herein, the reactive moieties are at least one of an acrylate, an alkene, a silane, and a siloxane.

In some embodiments of the methods disclosed herein, the ionic liquid complex prevents microbial growth on the surface. In some embodiments of the methods disclosed herein, microbial growth on the surface is prevented.

In some embodiments of the methods disclosed herein, the ionic liquid complex suppresses microbial growth on the surface. In some embodiments of the methods disclosed herein, microbial growth on the surface is suppressed.

In some embodiments of the methods disclosed herein, the surface coating is on an article. In some embodiments, for example, the article is selected from filters (e.g., hand-held water filters), membranes, packing materials (e.g., for foods, agriculture, paints, etc.), flow cells, filter gaskets, gloves, masks, garments, wound dressings, implants, catheters, and other medical devices. In some embodiments, the article is sterile.

In some embodiments of the surface coatings disclosed herein, the surface coating further comprises a cellulose derivative.

In some embodiments of the methods disclosed herein, the metal cation has a charge of +1. In some embodiments, the metal cation is a cation of Ag, In some embodiments of the methods disclosed herein, the metal cation has a charge of +2. In some embodiments, the metal cation is a cation of Ca, Cu, or Zn. In some embodiments, the metal cation is a cation of Cu. In some embodiments, the metal cation is a cation of Mg, Fe, Hg, Sr, Sn, Ca, Cd, Zn, Co, Cu, Pb, Ni, Sc, V, Cr, or Mn.

In some embodiments of the methods disclosed herein, the metal cation has a charge of +3. In some embodiments, the metal cation is a cation of Fe, La, Ce, Pr, Nd, Pm, Sm, Eu, Gd, Tb, Dy, Ho, Er, Tm, Yb, or Lu. In some embodiments, the metal cation is Fe(III).

In some embodiments of the methods disclosed herein, an ionic liquid complex comprising an ionic liquid chelated to a metal cation is formed.

In some embodiments of the methods disclosed herein, the ionic liquid comprises hydropobic moieties.

The physicochemical properties (e.g., viscosity) of the ionic liquids disclosed herein can be adjusted based on the chemical structure. In some embodiments of the methods disclosed herein, the ionic liquid has a low viscosity so as not to impede flow of a sample through the system.

In some embodiments of the methods disclosed herein, the ionic liquid has a high selectivity for transition metal ions (e.g., Fe, Hg, Cd, Zn, Co, Cu, Ni, Sc, V, Cr, and Mn). For example, the ionic liquid has a removal efficiency of at least 75%, at least 80%, at least 85%, at least 90%, at least 95%, at least 96%, at least 97%, at least 98%, or at least 99%.

In some embodiments of the methods disclosed herein, when an ionic liquid complex comprising an ionic liquid chelated to a metal cation is formed, the ionic liquid complex does not precipitate out of an aqueous solution. This is an improvement over other known ionic liquid complexes that precipitate out of aqueous solution, which can interfere with flow of a sample through the system.

In some embodiments of the ionic liquids and ionic liquid complexes disclosed herein, the ionic liquid or the ionic liquid complex forms a microemulsion, an emulsion, or a gel.

In some embodiments of the methods disclosed herein, the ionic liquid comprises a metal-chelating group. In some embodiments, the metal-chelating group is selected from the group consisting of an ethylaminediacetic acid moiety, a crown ether, a dithizone, a hydroxyl-quinoline, 2-thenoyl-trifluoroacetone, a thiosalicylate, a salicylate, a thiocarbamate, and an alkanolamine.

In some embodiments of the methods disclosed herein, the ionic liquid comprises a cation and an anion; and the cation is represented by the following structural formula I:

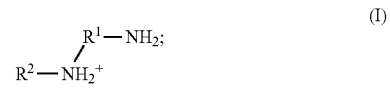

(I)

wherein, independently for each occurrence:
$R^1$ is $-(C(R)_2)_n-$;
n is 2, or 3;
$R^2$ is $-(C(R')_2)_m-R''$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R'' is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

The variables in formula I may be further selected as described below.

In some embodiments of the methods disclosed herein, the ionic liquid comprises a cation and an anion; and the cation is represented by the following structural formula II:

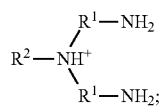

(II)

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

The variables in formula II may be further selected as described below.

In some embodiments of the ionic liquids disclosed herein, the anion is boron tetrafluoride, phosphorus tetrafluoride, phosphorus hexafluoride, alkylsulfonate, fluoroalkylsulfonate, arylsulfonate, bis(alkylsulfonyl)amide, bis(fluoroalkylsulfonyl)amide, bis(arylsulfonyl)amide, (fluoroalkylsulfonyl)(fluoroalkylcarbonyl)amide, halide, nitrate, nitrite, sulfate, hydrogensulfate, alkyl sulfate, aryl sulfate, carbonate, bicarbonate, carboxylate, phosphate, hydrogen phosphate, dihydrogen phosphate, hypochlorite, or an anionic site of a cation-exchange resin. In some embodiments, the anion is boron tetrafluoride, phosphorus tetrafluoride, phosphorus hexafluoride, halide, nitrate, nitrite, sulfate, hydrogensulfate, carbonate, bicarbonate, phosphate, hydrogen phosphate, dihydrogen phosphate, hypochlorite, or an anionic site of a cation-exchange resin. In some embodiments, the anion is $C_1$-$C_{12}$ alkylsulfonate, $C_1$-$C_{12}$ fluoroalkylsulfonate, $C_6$-$C_{10}$ arylsulfonate, $C_2$-$C_{24}$ bis(alkylsulfonyl)amide, $C_2$-$C_{24}$ bis(fluoroalkylsulfonyl)amide, $C_{12}$-$C_{20}$ bis(arylsulfonyl)amide, $C_2$-$C_{24}$ (fluoroalkylsulfonyl)(fluoroalkylcarbonyl)amide, $C_1$-$C_{12}$ alkyl sulfate, $C_6$-$C_{10}$ aryl sulfate, or $C_1$-$C_{12}$ carboxylate. In some embodiments, the anion is boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide. In some embodiments, the anion is methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide. In some embodiments, the anion is bis(methanesulfonyl)amide, bis(trifluoromethanesulfonyl)amide, bis(benzenesulfonyl)amide, or bis(p-toluenesulfonyl)amide. In some embodiments, the anion is bis(trifluoromethanesulfonyl)amide or (trifluoromethanesulfonyl)(trifluoroacetyl)amide. In some embodiments, the anion is bis(trifluoroethanesulfonyl)amide.

In some embodiments of the ionic liquids disclosed herein, the anion is antimicrobial. For example, the antimicrobial anion is penicillin or a related carboxylic acid (e.g., ampicillin, carbenicillin, oxacillin, narcillin, and cloxacillin). In some embodiments, the antimicrobial anion is ampicillin.

In some embodiments, the ionic liquid comprises poly(diallyldimethylammonium) cations and ampicillin counterions.

In some embodiments of the methods disclosed herein, the neutral ethylene diamine compound is represented by the following structural formula III:

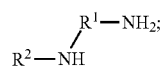

(III)

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

The variables in formula III may be further selected as described below.

In some embodiments of the methods disclosed herein, the neutral ethylene diamine compound is represented by the following structural formula IV:

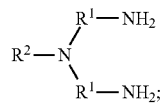

(IV)

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

The variables in formula IV may be further selected as described below.

In some embodiments, the microorganism is a bacterium, a virus, a fungus, or a parasite.

In some embodiments, the microorganism is a gram-negative bacterium. In some embodiments, the microorganism is a gram-positive bacterium. In some embodiments, for example, the microorganism is at least one bacterium selected from anthrax, *Bacilli, Bordetella, Borrelia*, botulism, *Brucella, Burkholderia, Campylobacter, Chlamydia*, cholera, *Clostridium, Conococcus, Corynebacterium*, diphtheria, *Enterobacter, Enterococcus, Erwinia, Escherichia, Francisella, Haemophhlus, Heliobacter, Klebsiella, Legionella, Leptospira*, leptospirosis, *Listeria*, Lyme's disease, *meningococcus, Mycobacterium, Mycoplasma, Neisseria, Pasteurella, Pelobacter*, plague, *Pneumonococcus, Proteus, Pseudomonas, Rickettsia, Salmonella, Serratia, Shigella*, Staphylococcus, Streptococcus, tetanus, *Treponeiema, Vibrio, Yersinia* and *Xanthomonas*. In some embodiments, the microorganism is *Pseudomonas aeruginosa*.

In some embodiments, for example, the microorganism is at least one virus selected from Adenoviridae, Papillomaviridae, Polyomaviridae, Herpesviridae, Poxviridae, Hepadnaviridae, Parvoviridae, Astroviridae, Caliciviridae, Picornaviridae, Coronoviridae, Flaviviridae, Retroviridae, Togaviridae, Arenaviridae, Bunyviridae, Filoviridae, Orthomyxoviridae, Paramyxoviridae, Rhabdoviridae, and Reoviridae. In certain embodiments, the virus may be arboviral encephalitis virus, adenovirus, herpes simplex type 1, herpes simplex type 2, Varicella-zoster virus, Epstein-barr virus, cytomegalovirus, herpesvirus type 8, papillomavirus, BK virus, coronavirus, echovirus, JC virus, smallpox, Hepatitis B, bocavirus, parvovirus B 19, astrovirus, Norwalk virus, coxsackievirus, Hepatitis A, poliovirus, rhinovinrs, severe acute respiratory syndrome virus, Hepatitis C, yellow fever, dengue virus, West Nile virus, rubella, Hepatitis E, human immunodeficiency virus (HIV), human T-cell lymphotropic virus (HTLV), influenza, guanarito virus, Junin virus, Lassa virus, Machupo virus, Sabia virus, Crimean-Congo hemorrhagic fever virus, ebola virus, Marburg virus, measles virus, molluscum virus, mumps virus, parainfluenza, respiratory syncytial virus, human metapneumovirus, Hendra virus, Nipah virus, rabies, Hepatitis D, rotavirus, orbivirus, coltivirus, vaccinia virus, and Banna virus.

In some embodiments, for example, the microorganism is at least one fungus selected from *Aspergillus (fumigatus, niger*, etc.), *Basidiobolus (ranarum*, etc), *Blastomyces dermatitidis, Candida (albicans, krusei, glabrata, tropicalis*, etc.), *Coccidioides immitis, Cryptococcus (neoformans*, etc.), eumycetoma, *Epidermophyton (floccosum*, etc), *Histoplasma capsulatum, Hortaea werneckii, Lacazia loboi, Microsproum (audouinii, nanum* etc.), *Mucorales (mucor, absidia, rhizophus), Paracoccidioides brasiliensis, Rhinosporidium seeberi, Sporothrix schenkii*, and *Trichophyton (schoeleinii, mentagrophetes, rubrum, verrucosum*, etc.).

In some embodiments, for example, the microorganism is at least one parasite selected from *Acanthamoeba, Babesia microti, Balantidium coli, Entamoeba hystolytica, Giardia lamblia, Cryptosporidium muris, Trypanosomatida gambiense, Trypanosomatida rhodesiense, Trypanosoma brucei, Trypanosoma cruzi, Leishmania mexicana, Leishmania braziliensis, Leishmania tropica, Leishmania donovani, Toxoplasma gondii, Plasmodium vivax, Plasmodium ovale, Plasmodium malariae, Plasmodium filciparum, Pneumocystis carinii, Trichomonas vaginalis, Histomonas melearidis, Secementea, Trichuris trichiura, Ascaris lumbricoides, Enterobius vermicularis, Ancylostoma duodenale, Naegleria fowleri, Necator americanus, Nippostrongylus brasiliensis, Strongyloides stercorais, Wuchereria bancrofti, Dracunculus medinensis*, blood flukes, liver flukes, intestinal flukes, lung flukes, *Schistosoma mansoni, Schistosoma haemnatobium, Schistosoma japonicum, Fasciola hepatica, Fasciola gigantica, Heterophyes heterophyes*, and *Paragonimus westermani*.

Compounds of the Disclosure
Ionic Liquid Complexes

In another aspect of the disclosure, provided herein is an ionic liquid complex, comprising an ionic liquid chelated to a metal cation, wherein the ionic liquid comprises a cation and an anion; and the cation is represented by the following structural formula I:

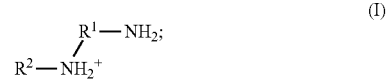

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

In still another aspect of the disclosure, provided herein is an ionic liquid complex, comprising an ionic liquid chelated to a metal cation, wherein the ionic liquid comprises a cation and an anion; and the cation is represented by the following structural formula II:

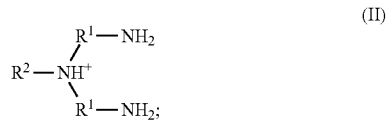

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

In some embodiments of the complexes disclosed herein, the metal cation has a charge of +1. In some embodiments, the metal cation is a cation of Ag, In some embodiments of the complexes disclosed herein, the metal cation has a charge of +2. In some embodiments, the metal cation is a cation of Ca, Cu, or Zn. In some embodiments, the metal cation is a cation of Cu.

Polymers

In another aspect, provided herein are homopolymers. In some embodiments, the homopolymer comprises a plurality of monomers comprising an ionic liquid. In some embodiments, the ionic liquid comprises a metal-chelating group. In some embodiments, the metal-chelating group is selected from the group consisting of an ethylaminediacetic acid moiety, a crown ether, a dithizone, a hydroxyl-quinoline, 2-thenoyltrifluoroacetone, a thiosalicylate, a salicylate, a thiocarbamate, and an alkanolamine.

In some embodiments, the homopolymer comprises a plurality of monomers comprising an ionic liquid, wherein the ionic liquid comprises a cation and an anion; and the cation is represented by the following structural formula I:

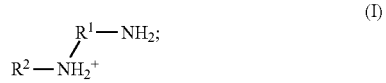

(I)

wherein, independently for each occurrence:

$R^1$ is —$(C(R)_2)_n$—;

n is 2, or 3;

$R^2$ is —$(C(R')_2)_m$—R";

m is 1, 2, 3, 4, 5, 6, 7, 8, 9, or 10; and

R is H, F, $C_1$-$C_3$ alkyl, or $C_1$-$C_3$ fluoroalkyl;

R' is H, F, $C_1$-$C_8$ alkyl, or $C_1$-$C_8$ fluoroalkyl; and

R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In some embodiments, the homopolymer comprises a plurality of monomers comprising an ionic liquid, wherein the ionic liquid comprises a cation and an anion; and the cation is represented by the following structural formula II:

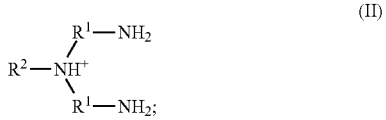

(II)

wherein, independently for each occurrence:

$R^1$ is —$(C(R)_2)_n$—;

n is 2, or 3;

$R^2$ is —$(C(R')_2)_m$—R";

m is 1, 2, 3, 4, 5, 6, 7, 8, 9, or 10; and

R is H, F, $C_1$-$C_3$ alkyl, or $C_1$-$C_3$ fluoroalkyl;

R' is H, F, $C_1$-$C_8$ alkyl, or $C_1$-$C_8$ fluoroalkyl; and

R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In still another aspect of the disclosure, provided herein is a homopolymer comprising a plurality of monomers comprising an ionic liquid complex, comprising an ionic liquid chelated to a metal cation. In some embodiments, the ionic liquid comprises a metal-chelating group. In some embodiments, the ionic liquid comprises a cation and an anion. In some embodiments, the cation is represented by structural formulas I or II.

In some embodiments of the homopolymers disclosed herein, an ionic liquid complex is formed, further comprising a metal cation chelated by the ionic liquid. In some embodiments, the cation is represented by structural formulas I or II.

In some embodiments, the homopolymer comprises a plurality of monomers comprising a neutral ethylene diamine compound represented by the following structural formula III:

(III)

wherein, independently for each occurrence:

$R^1$ is —$(C(R)_2)_n$—;

n is 2, or 3;

$R^2$ is —$(C(R')_2)_m$—R";

m is 1, 2, 3, 4, 5, 6, 7, 8, 9, or 10; and

R is H, F, $C_1$-$C_3$ alkyl, or $C_1$-$C_3$ fluoroalkyl;

R' is H, F, $C_1$-$C_8$ alkyl, or $C_1$-$C_8$ fluoroalkyl; and

R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In some embodiments, the homopolymer comprises a plurality of monomers comprising a neutral ethylene diamine compound represented by the following structural formula IV:

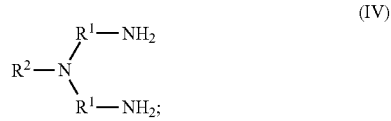

(IV)

wherein, independently for each occurrence:

$R^1$ is —$(C(R)_2)_n$—;

n is 2, or 3;

$R^2$ is —$(C(R')_2)_m$—R";

m is 1, 2, 3, 4, 5, 6, 7, 8, 9, or 10; and

R is H, F, $C_1$-$C_3$ alkyl, or $C_1$-$C_3$ fluoroalkyl;

R' is H, F, $C_1$-$C_8$ alkyl, or $C_1$-$C_8$ fluoroalkyl; and

R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In still another aspect of the disclosure, provided herein is a homopolymer comprising a plurality of monomers comprising a neutral ethylene diamine complex, comprising a neutral ethylene diamine chelated to a metal cation, wherein the neutral ethylene diamine comprises a cation and an anion. In some embodiments, the cation is represented by structural formulas III or IV.

In some embodiments of the homopolymers disclosed herein, a neutral ethylene diamine complex is formed, further comprising a metal cation chelated by the neutral ethylene diamine. In some embodiments, the neutral ethylene diamine is represented by structural formulas III or IV.

In some embodiments, the homopolymers comprise a plurality of (4-vinyl)benzylethylenediamine (VBEDA) monomers.

In another aspect, provided herein are copolymers. In some embodiments, the polymers comprise (VBEDA monomers as a second monomer. The monomer has been synthesized previously [18, 19], but antimicrobial properties have not been reported. In addition the structure of the EDA group previously was not altered to convert to an ionic liquid monomer (polyelectrolyte product). Antimicrobial properties of polymers with pendant biguanide groups has been demonstrated [21]. A huge variety of copolymers may be utilized to obtain the required physicochemical properties. For example, Sakohara et al. [19] used N-isopropylacrylamide (NIPAM) as the co-monomer to create thermoresponsive gels with a lower critical solution temperature (LCST) but other groups could be used to affect solubility on a range of solvents or combine with cationic monomers (with surfactant properties) for potential synergistic effects. Such polymers have advantages over small molecule antimicrobial agents as they demonstrate greater ability to disrupt the cell wall, bind to the bacterial membrane and adsorb to the surface. Polymeric cations may also be combined with antimicrobial anions. For example, cationic polymers based on poly(diallyldimethylammonium) cations with ampicillin counterions. Ampicillin is a known antimicrobial agent. Metal containing polymers with antimicrobial activity (polymeric biocides) have not been investigated before.

In one aspect of the disclosure, provided herein are polymers, wherein the polymer is a copolymer. In some embodiments, a polymer is comprised of a plurality of first monomers selected from the group consisting of an acrylate, an acrylamide, an alkene, a silane, and a siloxane compound and a plurality of second monomers, wherein the second monomer comprises an ionic liquid. In some embodiments, the ionic liquid comprises a metal-chelating group. In some embodiments, the metal-chelating group is selected from the group consisting of an ethylaminediacetic acid moiety, a crown ether, a dithizone, a hydroxyl-quinoline, 2-thenoyltrifluoroacetone, a thiosalicylate, a salicylate, a thiocarbamate, and an alkanolamine.

In some embodiments of the copolymers disclosed herein, the ionic liquid comprises a cation and an anion; and the cation is represented by the following structural formula I:

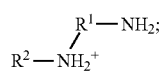

(I)

wherein, independently for each occurrence:
R$^1$ is —(C(R)$_2$)$_n$—;
n is 2, or 3;
R$^2$ is —(C(R')$_2$)$_m$—R";
m is 1, 2, 3, 4, 5, 6, 7, 8, 9, or 10; and
R is H, F, C$_1$-C$_3$ alkyl, or C$_1$-C$_3$ fluoroalkyl;
R' is H, F, C$_1$-C$_8$ alkyl, or C$_1$-C$_8$ fluoroalkyl; and
R" is C$_6$-C$_{10}$ aryl, C$_2$-C$_8$ alkenyl or C$_2$-C$_8$ fluoroalkenyl; wherein each instance of C$_6$-C$_{10}$ aryl is substituted with one, two, three, four or five substituents independently selected from the group consisting of C$_2$-C$_8$ alkenyl or C$_2$-C$_8$ fluoroalkenyl.

In another aspect of the disclosure, provided herein is a polymer comprised of a plurality of first monomers selected from the group consisting of an acrylate, an acrylamide, an alkene, a silane, and a siloxane compound and a plurality of second monomers, wherein the second monomer comprises an ionic liquid, wherein the ionic liquid comprises a cation and an anion; and the cation is represented by the following structural formula II:

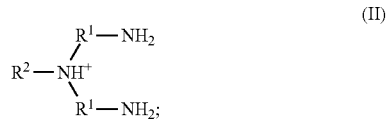

(II)

wherein, independently for each occurrence:
R$^1$ is —(C(R)$_2$)$_n$—;
n is 2, or 3;
R$^2$ is —(C(R')$_2$)$_m$—R";
m is 1, 2, 3, 4, 5, 6, 7, 8, 9, or 10; and
R is H, F, C$_1$-C$_3$ alkyl, or C$_1$-C$_3$ fluoroalkyl;
R' is H, F, C$_1$-C$_8$ alkyl, or C$_1$-C$_8$ fluoroalkyl; and
R" is C$_6$-C$_{10}$ aryl, C$_2$-C$_8$ alkenyl or C$_2$-C$_8$ fluoroalkenyl; wherein each instance of C$_6$-C$_{10}$ aryl is substituted with one, two, three, four or five substituents independently selected from the group consisting of C$_2$-C$_8$ alkenyl or C$_2$-C$_8$ fluoroalkenyl.

In some embodiments, the second monomer comprises poly(diallyldimethylammonium) cations and ampicillin counterions.

In still another aspect of the disclosure, provided herein is polymer, wherein the second monomer comprises an ionic liquid complex, comprising an ionic liquid chelated to a metal cation, wherein the ionic liquid comprises a cation and an anion. In some embodiments, the cation is represented by structural formulas I or II.

In some embodiments of the polymers disclosed herein, an ionic liquid complex is formed, further comprising a metal cation chelated by the ionic liquid. In some embodiments, the cation is represented by structural formulas I or II.

In yet another aspect of the disclosure, provided herein is a polymer comprised of a plurality of first monomers selected from the group consisting of an acrylate, an acrylamide, an alkene, a silane, and a siloxane compound and a plurality of second monomers, wherein the second monomer comprises a neutral ethylene diamine compound represented by the following structural formula III:

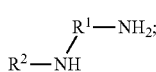

(III)

wherein, independently for each occurrence:
R$^1$ is —(C(R)$_2$)$_n$—;
n is 2, or 3;
R$^2$ is —(C(R')$_2$)$_m$—R";
m is 1, 2, 3, 4, 5, 6, 7, 8, 9, or 10; and
R is H, F, C$_1$-C$_3$ alkyl, or C$_1$-C$_3$ fluoroalkyl;
R' is H, F, C$_1$-C$_8$ alkyl, or C$_1$-C$_8$ fluoroalkyl; and
R" is C$_6$-C$_{10}$ aryl, C$_2$-C$_8$ alkenyl or C$_2$-C$_8$ fluoroalkenyl; wherein each instance of C$_6$-C$_{10}$ aryl is substituted with one, two, three, four or five substituents independently selected from the group consisting of C$_2$-C$_8$ alkenyl or C$_2$-C$_8$ fluoroalkenyl.

In a further aspect of the disclosure, provided herein is a polymer comprised of a plurality of first monomers selected from the group consisting of an acrylate, an acrylamide, an alkene, a silane, and a siloxane compound and a plurality of second monomers, wherein the second monomer comprises a neutral ethylene diamine compound represented by the following structural formula IV:

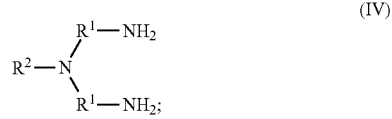

(IV)

wherein, independently for each occurrence:
R¹ is —(C(R)₂)ₙ—;
n is 2, or 3;
R² is —(C(R')₂)ₘ—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In another aspect of the disclosure, provided herein is polymer, wherein the second monomer comprises a neutral ethylene diamine complex, comprising a neutral ethylene diamine compound chelated to a metal cation. In some embodiments, the neutral ethylene diamine is represented by structural formulas III or IV. In some embodiments, the neutral ethylene diamine is N-(4-vinyl)benzylethylene-diamine.

In some embodiments of the polymers disclosed herein, a neutral ethylene diamine complex is formed, further comprising a metal cation chelated by the neutral ethylene diamine. In some embodiments, the neutral ethylene diamine is represented by structural formulas III or IV.

In some embodiments, the molar ratio of the first monomer to the second monomer is 100:1 to 1:1.

In some embodiments, the first monomer is present at about 90 mol % to about 99 mol % while the second monomer is present at about 1 mol % to about 10 mole %. In some embodiments, the first monomer is present at about 95 mol % while the second monomer is present at about 5 mol %.

In some embodiments of the polymers disclosed herein, a metal cation is chelated to the polymer after the polymer is formed. In some embodiments, the molar ratio of the second monomer to the metal cation about 1:1. In some embodiments, the molar ratio of the second monomer comprising an IL to the metal cation about 1:1. In some embodiments, the molar ratio of the second monomer comprising a neutral ethylene diamine compound to the metal cation about 1:1. In some embodiments, the metal content varies from about 5 mol % to about 40 mol %.

In some embodiments of the polymers disclosed herein, the polymers are hydrophobic. In some embodiments, the polymers are water insoluble.

In some embodiments of the polymers disclosed herein, the neutral ethylene diamine is converted to an ionic liquid monomer before polymerization. In some embodiments, the polymer comprising a neutral ethylene diamine is converted to an ionic liquid after polymerization.

In some embodiments of the polymers disclosed herein, the first monomer is an acrylamide. In some embodiments, the first monomer is N-isopropylacrylamide (NIPAM).

were demonstrated as a function of metal content (homopolymer) and/or VBEDA content (heteropolymer) as well as molecular weight Exemplary Embodiments of Variables in Structural Formulas I, II, III, and IV In some embodiments of structural formulas I, II, III, or IV, wherein n is 3. In some embodiments, n is 2. The remainder of the variables in structural formulas I, II, III, or IV may be selected as described above or below.

In some embodiments of structural formulas I, II, III, or IV, wherein m is 1, 2, 3, or 4. In some embodiments, m is 5, 6, or 7. In some embodiments, m is 8, 9, or 10. In some embodiments, m is 1. In some embodiments, m is 4. In some embodiments, m is 6. The remainder of the variables in structural formulas I, II, III, or IV may be selected as described above or below.

In some embodiments of structural formulas I, II, III, or IV, wherein R is F. In some embodiments, R is, for each instance independently, $C_1$-$C_3$ alkyl. In some embodiments, R is, for each instance independently, $C_1$-$C_3$ fluoroalkyl. In some embodiments, R is H. The remainder of the variables in structural formulas I, II, III, or IV may be selected as described above or below.

In some embodiments of structural formulas I, II, III, or IV, wherein R' is F. In some embodiments, R' is $C_1$-$C_8$ alkyl. In some embodiments, R' is $C_1$-$C_8$ fluoroalkyl. In some embodiments, R' is H. The remainder of the variables in structural formulas I, II, III, or IV may be selected as described above or below.

In some embodiments of structural formulas I, II, III, or IV, wherein R" is F. In some embodiments, R" is $C_1$-$C_3$ alkyl. In some embodiments, R" is $C_1$-$C_3$ fluoroalkyl. In some embodiments, R" is $C_1$-$C_3$ alkyloxy. In some embodiments, R" is $C_1$-$C_3$ fluoroalkyloxy. In some embodiments, R" is $C_6$-$C_{10}$ aryl. In some embodiments, R" is $C_2$-$C_8$ alkenyl. In some embodiments, R" is $C_2$ alkenyl. In some embodiments, R" is $C_2$-$C_8$ fluoroalkenyl. In some embodiments, R" is H.

In some embodiments, R" is $C_6$-$C_{10}$ aryl, $C_2$-$C_8$ alkenyl or $C_2$-$C_8$ fluoroalkenyl; wherein each instance of $C_6$-$C_{10}$ aryl is substituted with one, two, three, four or five substituents independently selected from the group consisting of $C_2$-$C_8$ alkenyl or $C_2$-$C_8$ fluoroalkenyl.

In some embodiments, when R" is $C_6$-$C_{10}$ aryl, it is unsubstituted.

In some embodiments, when R" is $C_6$-$C_{10}$ aryl, it is substituted. In some embodiments, when R" is $C_6$ aryl, it is substituted.

In some embodiments, the one or more substituents on R" are independently selected from F, $C_1$-$C_3$ alkyl, and $C_1$-$C_3$ fluoroalkyl. In some embodiments, the one or more substituents on R" are independently selected from $C_1$-$C_3$ alkyl. In some embodiments, the one or more substituents on R" are independently selected from $C_2$-$C_8$ alkenyl or $C_2$-$C_8$ fluoroalkenyl. In some embodiments, the one or more substituents on R" are independently selected from $C_2$-$C_8$ alkenyl. In some embodiments, the one or more substituents on R" are independently $C_2$ alkenyl. In some such embodiments, R" is substituted with one substituent selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy. In some such embodiments, R" is substituted with two substituents selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy. In some such embodiments, R" is substituted with three such substituents. In some such embodiments, R" is substituted with four such substituents. In some such embodiments, R" is substituted with five such substituents. The remainder of the variables in structural formulas I, II, III, or IV may be selected as described above or below.

In some embodiments of structural formulas I, II, III, or IV, n is 2; and R is H. In some embodiments, m is 1; R" is substituted $C_6$ aryl, wherein the substituent on R" is $C_2$ alkenyl. The remainder of the variables in structural formulas I, II, III, or IV may be selected as described above or below.

In some embodiments of structural formulas I or II, m is 4; and R" is H. In some embodiments, $R^2$ is butyl. In some embodiments, m is 6; and R" is H. In some embodiments, $R^2$ is 2-ethylhexyl. In some embodiments, $R^2$ is hexyl. The remainder of the variables in structural formulas I or II may be selected as described above or below.

Definitions

Unless otherwise defined herein, scientific and technical terms used in this application shall have the meanings that are commonly understood by those of ordinary skill in the art. Generally, nomenclature used in connection with, and techniques of, chemistry described herein, are those well-known and commonly used in the art.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group, having an oxygen attached thereto. Representative alkoxy groups include methoxy, trifluoromethoxy, ethoxy, propoxy, tert-butoxy and the like.

The term "alkoxyalkyl" refers to an alkyl group substituted with an alkoxy group and may be represented by the general formula alkyl-O-alkyl.

The term "alkenyl", as used herein, refers to an aliphatic group containing at least one double bond and is intended to include both "unsubstituted alkenyls" and "substituted alkenyls", the latter of which refers to alkenyl moieties having substituents replacing a hydrogen on one or more carbons of the alkenyl group. Typically, a straight chained or branched alkenyl group has from 1 to about 20 carbon atoms, preferably from 1 to about 10 unless otherwise defined. Such substituents may occur on one or more carbons that are included or not included in one or more double bonds. Moreover, such substituents include all those contemplated for alkyl groups, as discussed below, except where stability is prohibitive. For example, substitution of alkenyl groups by one or more alkyl, carbocyclyl, aryl, heterocyclyl, or heteroaryl groups is contemplated.

An "alkyl" group or "alkane" is a straight chained or branched non-aromatic hydrocarbon which is completely saturated. Typically, a straight chained or branched alkyl group has from 1 to about 20 carbon atoms, preferably from 1 to about 10 unless otherwise defined. In some embodiments, the alkyl group has from 1 to 8 carbon atoms, from 1 to 6 carbon atoms, from 1 to 4 carbon atoms, or from 1 to 3 carbon atoms. Examples of straight chained and branched alkyl groups include methyl, ethyl, n-propyl, iso-propyl, n-butyl, sec-butyl, tert-butyl, pentyl, hexyl, pentyl and octyl.

Moreover, the term "alkyl" as used throughout the specification, examples, and claims is intended to include both "unsubstituted alkyls" and "substituted alkyls", the latter of which refers to alkyl moieties having substituents replacing a hydrogen on one or more substitutable carbons of the hydrocarbon backbone. Such substituents, if not otherwise specified, can include, for example, a halogen (e.g., fluoro), a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that the moieties substituted on the hydrocarbon chain can themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls can be further substituted with alkyls, alkenyls, alkoxys, alkylthios, aminoalkyls, carbonyl-substituted alkyls, —$CF_3$, —CN, and the like.

The term "$C_{x-y}$" when used in conjunction with a chemical moiety, such as, acyl, acyloxy, alkyl, alkenyl, alkynyl, or alkoxy is meant to include groups that contain from x to y carbons in the chain. For example, the term "$C_{x-y}$ alkyl" refers to substituted or unsubstituted saturated hydrocarbon groups, including straight-chain alkyl and branched-chain alkyl groups that contain from x to y carbons in the chain, including haloalkyl groups. Preferred haloalkyl groups include trifluoromethyl, difluoromethyl, 2,2,2-trifluoroethyl, and pentafluoroethyl. Co alkyl indicates a hydrogen where the group is in a terminal position, a bond if internal. The terms "$C_{2-y}$ alkenyl" and "$C_{2-y}$ alkynyl" refer to substituted or unsubstituted unsaturated aliphatic groups analogous in length and possible substitution to the alkyls described above, but that contain at least one double or triple bond respectively.

The term "alkylamino", as used herein, refers to an amino group substituted with at least one alkyl group.

The term "alkylthio", as used herein, refers to a thiol group substituted with an alkyl group and may be represented by the general formula alkylS—.

The term "arylthio", as used herein, refers to a thiol group substituted with an alkyl group and may be represented by the general formula arylS—.

The term "alkynyl", as used herein, refers to an aliphatic group containing at least one triple bond and is intended to include both "unsubstituted alkynyls" and "substituted alkynyls", the latter of which refers to alkynyl moieties having substituents replacing a hydrogen on one or more carbons of the alkynyl group. Typically, a straight chained or branched alkynyl group has from 1 to about 20 carbon atoms, preferably from 1 to about 10 unless otherwise defined. Such substituents may occur on one or more carbons that are included or not included in one or more triple bonds. Moreover, such substituents include all those contemplated for alkyl groups, as discussed above, except where stability is prohibitive. For example, substitution of alkynyl groups by one or more alkyl, carbocyclyl, aryl, heterocyclyl, or heteroaryl groups is contemplated.

The term "amide", as used herein, refers to a group

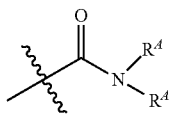

wherein each $R^A$ independently represent a hydrogen or hydrocarbyl group, or two $R^A$ are taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

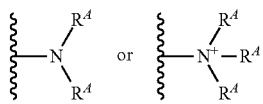

wherein each $R^A$ independently represents a hydrogen or a hydrocarbyl group, or two $R^A$ are taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 6- or 20-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

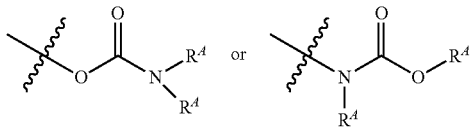

wherein each $R^A$ independently represent hydrogen or a hydrocarbyl group, such as an alkyl group, or both $R^A$ taken together with the intervening atom(s) complete a heterocycle having from 4 to 8 atoms in the ring structure.

The terms "carbocycle", and "carbocyclic", as used herein, refers to a saturated or unsaturated ring in which each atom of the ring is carbon. Preferably, a carbocyclic group has from 3 to 20 carbon atoms. The term carbocycle includes both aromatic carbocycles and non-aromatic carbocycles. Non-aromatic carbocycles include both cycloalkane rings, in which all carbon atoms are saturated, and cycloalkene rings, which contain at least one double bond. "Carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo[2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

A "cycloalkyl" group is a cyclic hydrocarbon which is completely saturated. "Cycloalkyl" includes monocyclic and bicyclic rings. Preferably, a cycloalkyl group has from 3 to 20 carbon atoms. Typically, a monocyclic cycloalkyl group has from 3 to about 10 carbon atoms, more typically 3 to 8 carbon atoms unless otherwise defined. The second ring of a bicyclic cycloalkyl may be selected from saturated, unsaturated and aromatic rings. Cycloalkyl includes bicyclic molecules in which one, two or three or more atoms are shared between the two rings. The term "fused cycloalkyl" refers to a bicyclic cycloalkyl in which each of the rings shares two adjacent atoms with the other ring. The second ring of a fused bicyclic cycloalkyl may be selected from saturated, unsaturated and aromatic rings. A "cycloalkenyl" group is a cyclic hydrocarbon containing one or more double bonds.

The term "carbocyclylalkyl", as used herein, refers to an alkyl group substituted with a carbocycle group.

The term "carbonate", as used herein, refers to a group —OCO$_2$—$R^A$, wherein $R^A$ represents a hydrocarbyl group.

The term "carboxy", as used herein, refers to a group represented by the formula —CO$_2$H.

The term "ester", as used herein, refers to a group —C(O)OR$^A$ wherein $R^A$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical.

Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The term "heteroalkyl", as used herein, refers to a saturated or unsaturated chain of carbon atoms and at least one heteroatom, wherein no two heteroatoms are adjacent.

The terms "heteroaryl" and "hetaryl" include substituted or unsubstituted aromatic single ring structures, preferably 5- to 20-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The terms "heterocyclyl", "heterocycle", and "heterocyclic" refer to substituted or unsubstituted non-aromatic ring structures, preferably 3- to 20-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "heterocyclylalkyl", as used herein, refers to an alkyl group substituted with a heterocycle group.

The term "hydrocarbyl", as used herein, refers to a group that is bonded through a carbon atom, wherein that carbon atom does not have a =O or =S substituent. Hydrocarbyls may optionally include heteroatoms. Hydrocarbyl groups include, but are not limited to, alkyl, alkenyl, alkynyl, alkoxyalkyl, aminoalkyl, aralkyl, aryl, aralkyl, carbocyclyl, cycloalkyl, carbocyclylalkyl, heteroaralkyl, heteroaryl groups bonded through a carbon atom, heterocyclyl groups bonded through a carbon atom, heterocyclylakyl, or hydroxyalkyl. Thus, groups like methyl, ethoxyethyl, 2-pyridyl, and trifluoromethyl are hydrocarbyl groups, but substituents such as acetyl (which has a =O substituent on the linking carbon) and ethoxy (which is linked through oxygen, not carbon) are not.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are six or fewer non-hydrogen atoms in the substituent. A "lower alkyl", for example, refers to an alkyl group that contains six or fewer carbon atoms. In some embodiments, the alkyl group has from 1 to 6 carbon atoms, from 1 to 4 carbon atoms, or from 1 to 3 carbon atoms. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

In the phrase "poly(meta-phenylene oxides)", the term "phenylene" refers inclusively to 6-membered aryl or 6-membered heteroaryl moieties. Exemplary poly(meta-phenylene oxides) are described in the first through twentieth aspects of the present disclosure.

The term "silyl" refers to a silicon moiety with three hydrocarbyl moieties attached thereto.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. Moieties that may be substituted can include any appropriate substituents described herein, for example, acyl, acylamino, acyloxy, alkoxy, alkoxyalkyl, alkenyl, alkyl, alkylamino, alkylthio, arylthio, alkynyl, amide, amino, aminoalkyl, aralkyl, carbamate, carbocyclyl, cycloalkyl, carbocyclylalkyl, carbonate, ester, ether, heteroaralkyl, heterocyclyl, heterocyclylalkyl, hydrocarbyl, silyl, sulfone, or thioether. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. In preferred embodiments, the substituents on substituted alkyls are selected from $C_{1-6}$ alkyl, $C_{3-6}$ cycloalkyl, halogen, carbonyl, cyano, or hydroxyl. In more preferred embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

The term "sulfonate" is art-recognized and refers to the group $SO_3H$, or a pharmaceutically acceptable salt thereof.

The term "sulfone" is art-recognized and refers to the group —S(O)$_2$—R$^4$, wherein R$^4$ represents a hydrocarbyl.

The term "thioether", as used herein, is equivalent to an ether, wherein the oxygen is replaced with a sulfur.

EXAMPLES

The invention now being generally described, it will be more readily understood by reference to the following examples, which are included merely for purposes of illustration of certain aspects and embodiments of the present invention, and are not intended to limit the invention.

Example 1: Synthesis of
N-Hexylethylenediaminium
Bis(Trifluoroethanesulfonyl)Amide, [Hhex][Tf$_2$N]

N-hexylethylenediaminium bis(trifluoroethanesulfonyl) amide, [HHex][Tf$_2$N] was synthesized according to the following procedure.

Bis(trifluoromethane)sulfonamide (Tf$_2$NH)>95%) and [HHex][Tf$_2$N] were purchased from Santa Cruz Biotechnology, 1-bromohexane (98%), ethylenediamine (>99%), copper (II) nitrate trihydrate (puriss) were purchased from Sigma Aldrich and used without further purification.

Hexyl(ethylenediamine) was synthesized by adding 1-bromohexane (35 mL, 0.25 moles) dropwise to an excess of ethylenediamine (250 mL, 3.75 moles) over 2 hours. After the reaction mixture was stirred overnight the unreacted ethylenediamine was removed at reduced pressure. The residue was washed with 40% sodium hydroxide solution, the top layer was removed and further washed with water. The product was then purified by distillation under reduced pressure (90° C., ~10 mbar).

Hexyl(ethylenediamine) was neutralized with acid (Tf$_2$NH) by mixing in 1:1 molar ratio in diethyl ether solution and then isolated by evaporation of the diethyl ether. The compound was dried in vacuo until the water content fell below 500 ppm (as measured by Karl Fischer titration). Purity of the compounds was confirmed by elemental analysis and $^1$H-NMR peaks agreed with the literature. The ionic liquid had a melting point of about −100° C. N-butyl(ethylenediaminium) bis(trifluoroethanesulfonyl)amide was prepared similarly.

Example 2: Antimicrobial Effect

Effect of [HHex][Tf$_2$N]

Antimicrobial sensitivity experiments used *Pseudomonas aeruginosa* (PA14, FIG. 2) a gram-negative monoflagellated bacterium. This is a model bacterium for such studies as it is the most abundant organism on earth and is an opportunistic human pathogen, colonizing immunocompromised patients, such as those with cystic fibrosis, cancer, or AIDS [15]. It exhibits intrinsic resistance to many different types of chemotherapeutic agents and antibiotics, making it a very hard pathogen to eliminate [16]. Copper containing IL showed an order of magnitude drop in the colony-forming unit (CFU) and the Ag-IL compound demonstrated more than 4 orders of magnitude drop in CFU. In this sample, the amount of bacteria was below the threshold of detection.

Figure 2:
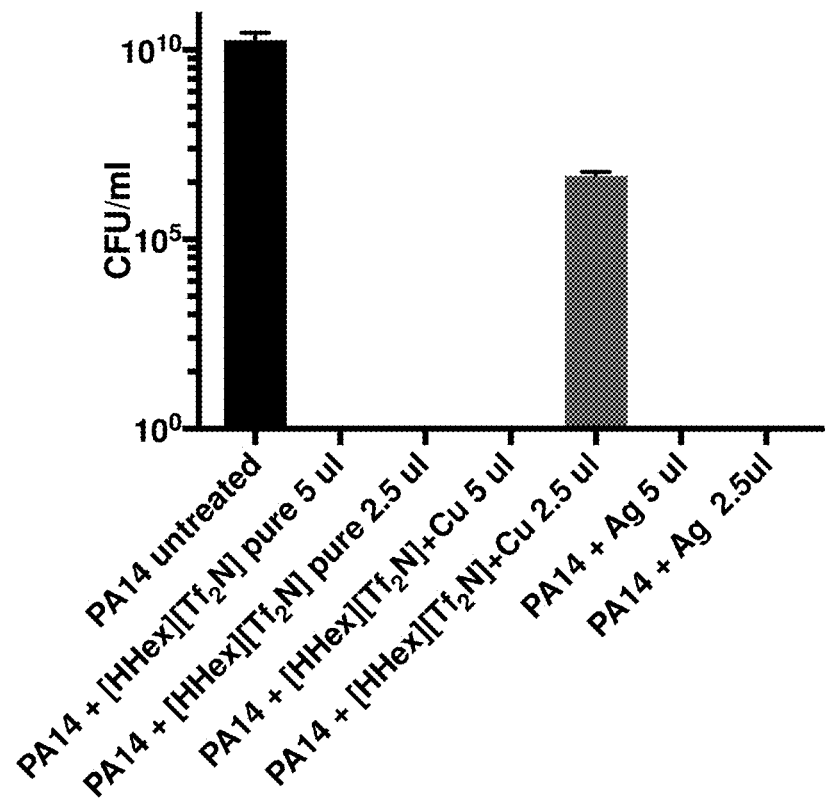
FIG. 2 shows the colony forming units (CFU) per mL of mixture containing PA14 compared with control samples for pure [HHex][Tf$_2$N], and bound to Cu and Ag as functions of concentration.
Figure 3:
FIG. 3 shows turbidity of PA14 and PA14+[HHex][Tf$_2$N] solutions as an indication of bacterial growth.
Figure 4:
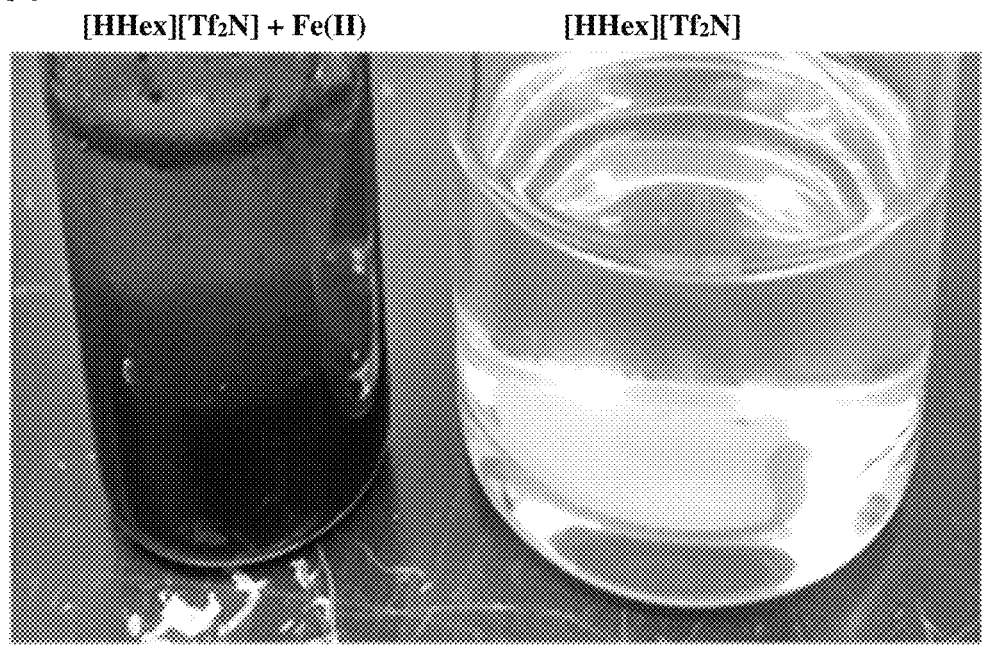
FIG. 4 shows binding of [HHex][Tf$_2$N] with Fe(II) ions to form a green complex (left) and pure IL for comparison (right).

Interestingly, the pure metal-free compound ([HHex][Tf$_2$N]) demonstrated a drop in CFU by almost 3 orders of magnitude (FIG. 2). FIG. 3 showed how a solution of 10 uL IL still exhibited no turbidity and therefore no bacteria growth. The IL bound Fe(II) ions (as demonstrated by binding to FeSO$_4$ (FIG. 4). Iron is a vital nutrient for all life. Bacterial pathogens are not exempt from this iron requirement. These organisms must acquire iron from within their hosts in order to replicate and cause disease [17]. Without wishing to be bound by any theory, the IL may chelate iron making it unavailable for the bacteria to synthesize, in exactly the same way the human defense mechanism works [18]. These compounds exhibit much greater bacterial killing than any ILs previously reported ILs [8].

Fe(II) and Fe(III) solutions in water were prepared at concentrations ranging 0.06 ppm to 5860 ppm. 1 mL of this solution was mixed with 1 mL of ionic liquid. The iron was extracted into the IL phase and the immiscible phases were separated by centrifugation. The concentration of the metal in the aqueous phase was then investigated using Inductively Coupled Plasma Optical Emission Spectroscopy (ICP-OES) analysis. In many cases the remaining levels were lower than that of the detector (5 ppb).

TABLE 1

Extraction efficiency of 1 mL ionic liquid for Fe(III) ions from 1 mL of aqueous solution.

| [Fe (III)] before extraction (ppm) | [Fe (III)] after extraction (ppm) | % extracted |
|---|---|---|
| 5860.33 | 54.60 | 99.1 |
| 501.53 | 2.81 | 99.4 |
| 53.48 | 4.14 | 92.5 |
| 4.79 | — | 100 |
| 0.48 | — | 100 |
| 0.06 | — | 100 |

Effect on Various Microbes

*Escherichia coli* strain BL21, *Staphylococcus aureus* strain ATCC12600, *Pseudomonas aeruginosa* strains PA01 and PA14 were grown in LB medium overnight at 37° C. and stirring on (250 rpm). Subcultures of the cells were prepared in LB medium (1:100 dilution) and grown until OD$_{600}$ reached 0.5. After that, the solutions were diluted (1:10,000) and added to 96-well plates.

Figure 5:
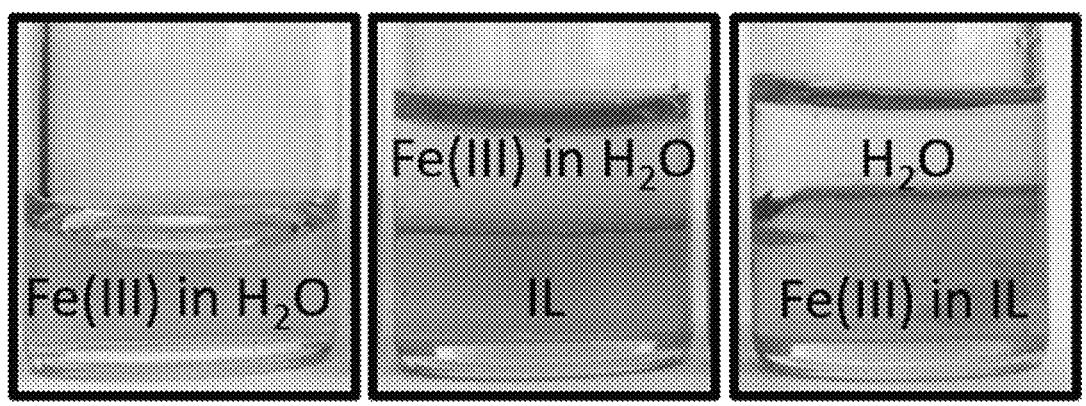
FIG. 5 shows extraction of Fe(III) from an aqueous solution to form an IL complex.
Figure 6:
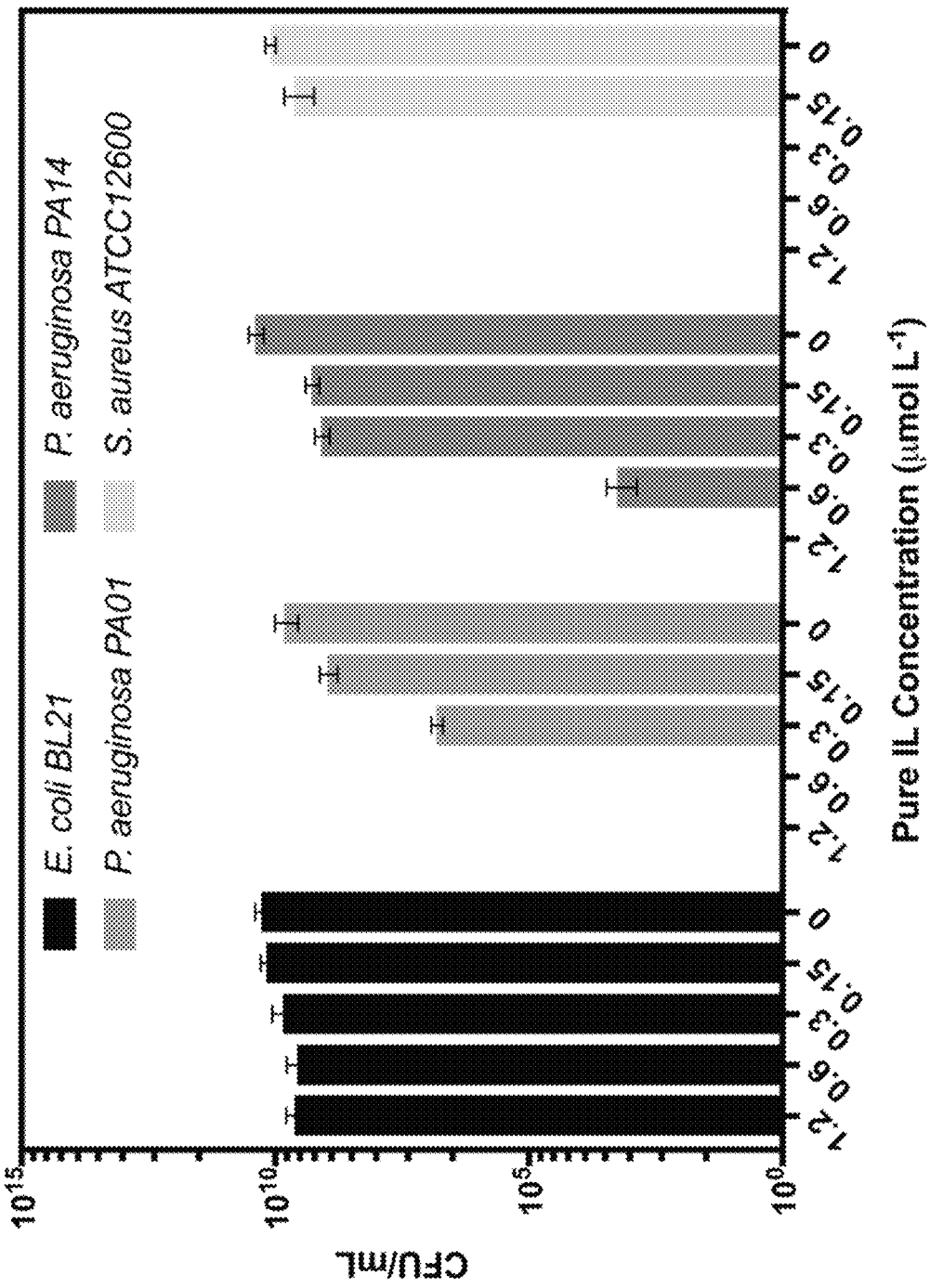
FIG. 6 shows the colony counts (CFU/mL) of bacteria after incubation with [HHex][Tf$_2$N].
Figure 7:
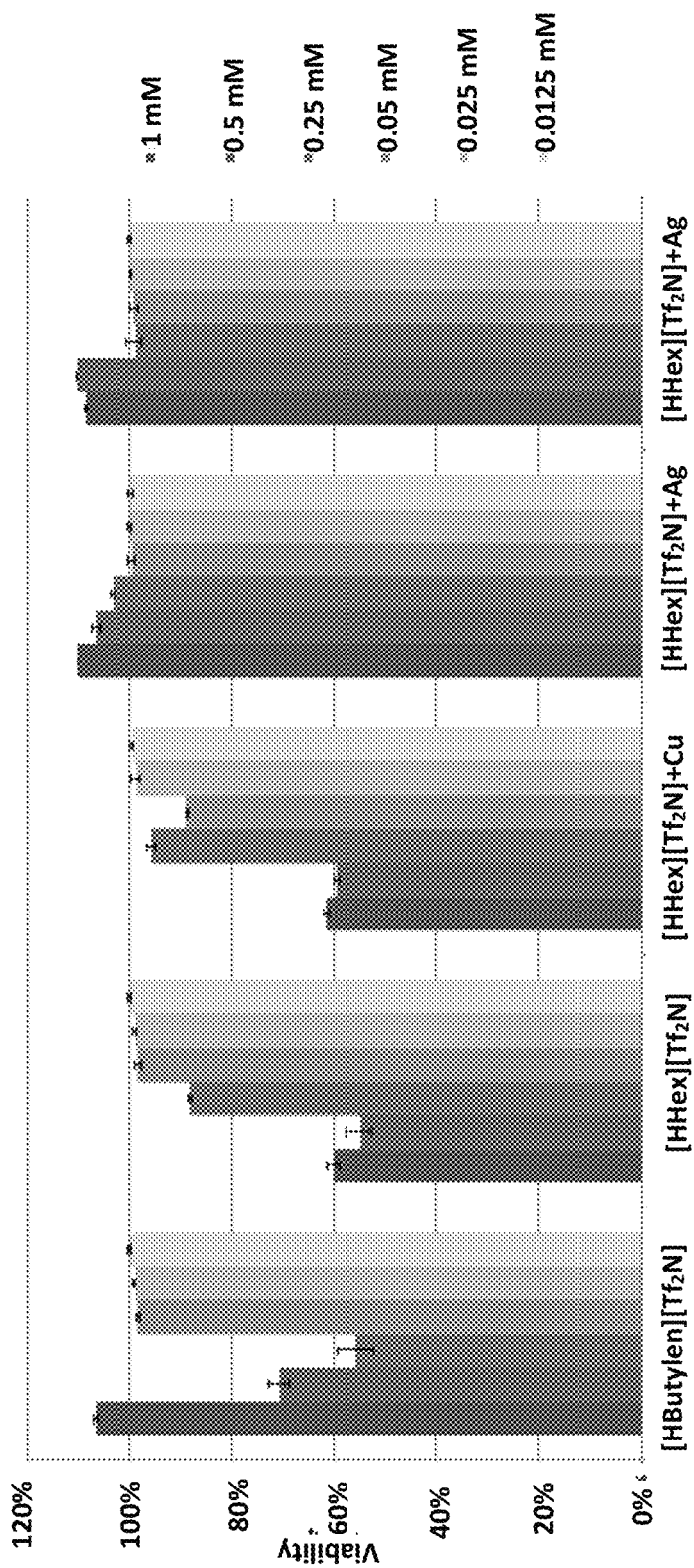
FIG. 7 shows the percentage viability of HEK cells with increasing concentrations of ILs [HButylen][Tf$_2$N], [HHex][Tf$_2$N], [HHex][Tf$_2$N] chelated to 20% Cu, [HHex][Tf$_2$N] chelated to Ag, and [HHex][Tf$_2$N] chelated to Ag at increasing concentrations.
Figure 8A:
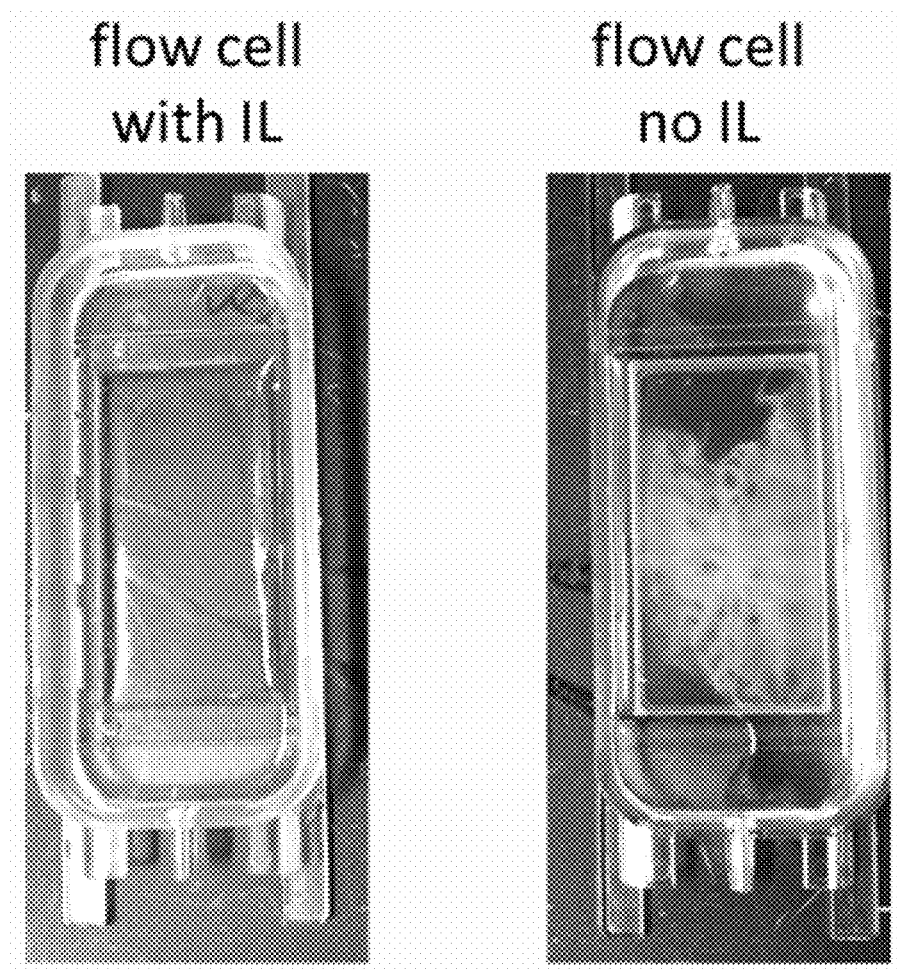
FIG. 8A shows images of flow cells treated with [HHex][Tf$_2$N] encapsulated in a polymer coating (left), and without an encapsulated ionic liquid (right).
Figure 8B:
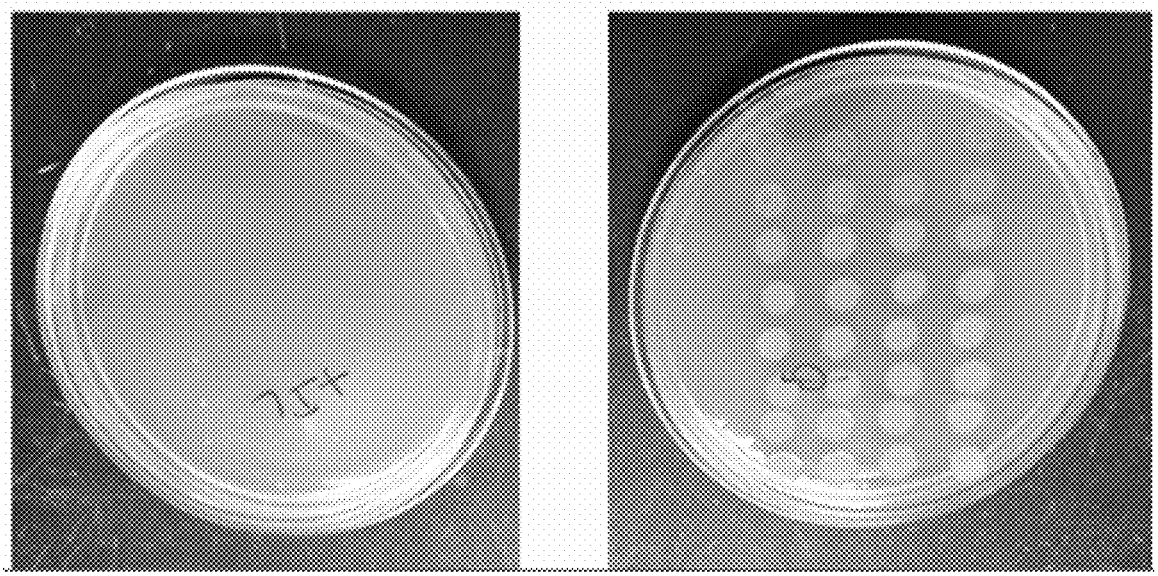
FIG. 8B shows images of the resulting bacterial growth based on the flow cells treated with [HHex][Tf$_2$N] encapsulated in a polymer coating (left), and without an encapsulated ionic liquid (right).
Figure 8C:
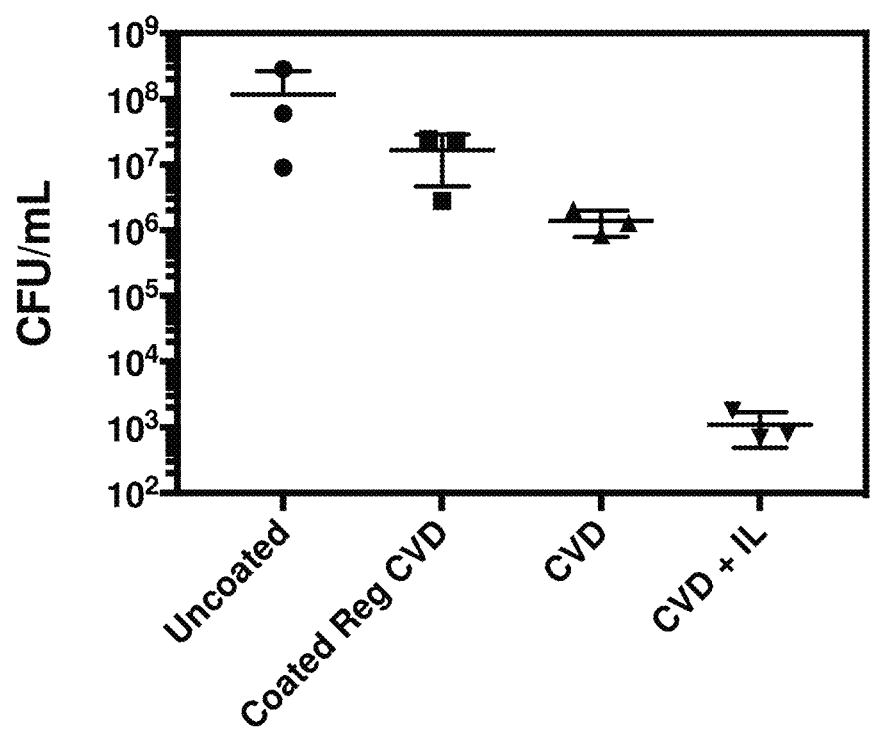
FIG. 8C shows the colony counts (CFU/mL) of the resulting bacterial growth based on the catheters treated with nothing (uncoated), with a polymer coating but no IL (coated Reg CVD), without an encapsulated ionic liquid (CVD), [HHex][Tf$_2$N] encapsulated in a polymer coating (CVD+IL).
Figure 9:
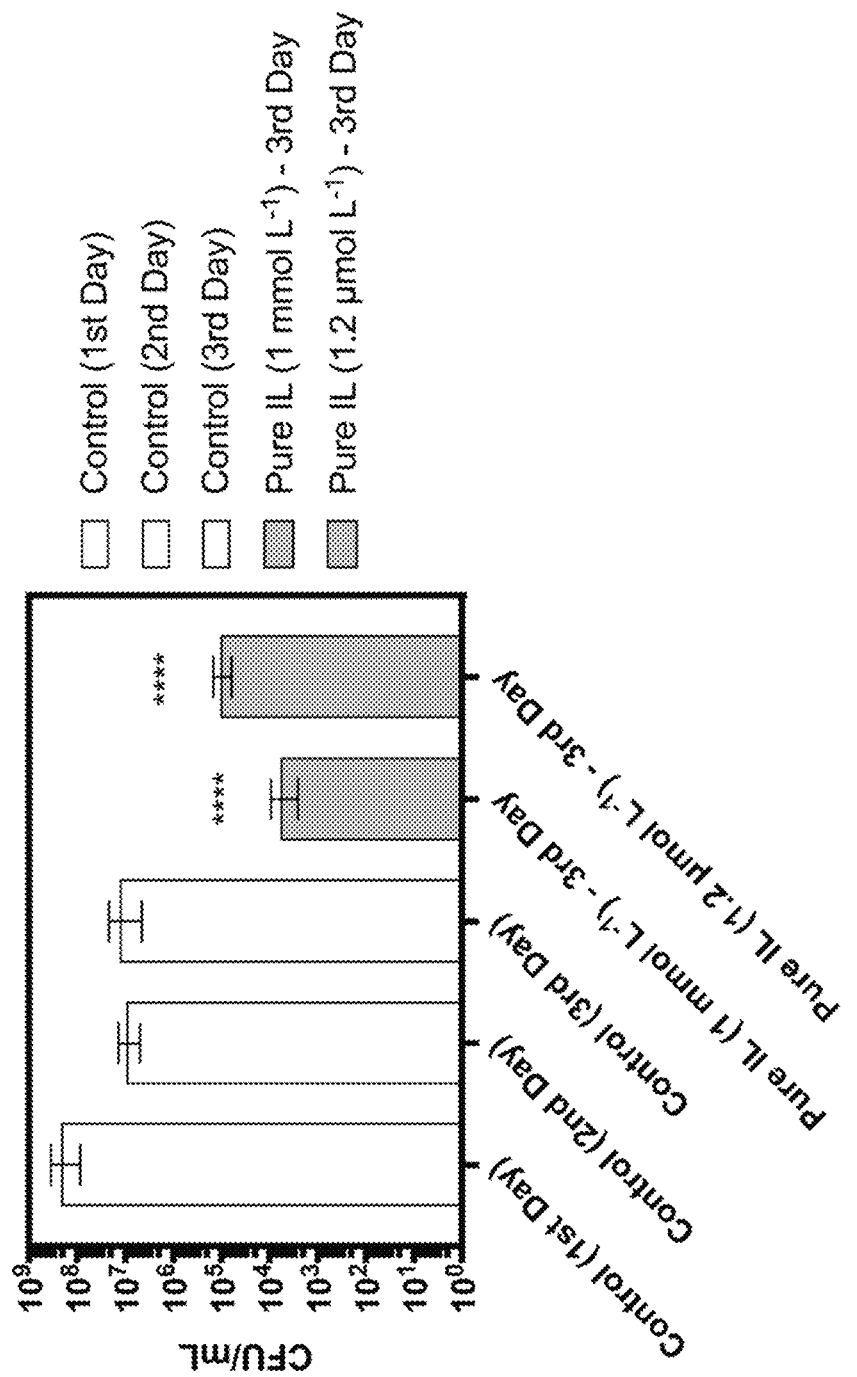
FIG. 9 shows the colony counts (CFU/mL) of bacteria in a mouse scarification model with and without IL [HHex][Tf$_2$N].

Dilution series of the pure ionic liquid, ranging from 1.2 to 0 μmol L$^{-1}$ of pure ionic liquid (IL; [HHex][Tf$_2$N]) were incubated with the bacteria at 37° C. for 22 h. 10-fold dilution series of each well were made in water, platted in LB agar plates (*E. coli* BL21 and *S. aureus* ATCC 12600) or *Pseudomonas* Isolation Agar (*P. aeruginosa* PA01 and PA14) and incubated at 37° C. for 24 h. The colonies (CFU/mL) were counted visually and experiments were made in triplicates (FIG. 5).

Example 3: Cell Viability Assay

The toxicity of the compounds towards human cells was tested using HEK cell lines (FIG. 5), which were cultured in DMEM medium and 10% Fetal Bovine Serum at 37° C. in 5% CO$_2$. 5×10$^4$ cells were seeded into 96-well plates 24 hours before treatment. Incremental concentrations of ionic liquids (diluted 2×) were added into the wells for another 24 hours. The release of the cytosolic enzyme lactate dehydrogenase (LDH) was then measured, following the manual of Pierce LDH Cytotoxicity Assay Kit (Thermofisher, Mass., USA). Untreated cells (live cells) and cells treated with lysis buffer for 2 hours (dead cells) were used as the reference for normalization. All experiments were performed in triplicate. Differential toxicity effects against HEK cells were observed with the battery of ILs tested. The cytotoxicity experiments using HEK cell lines in an LDH assay revealed that ionic liquid complexes comprising Ag chelated to [HHex][Tf$_2$N]) exhibited no toxicity, whereas the IL [HButylen][Tf$_2$N], the IL [HHex][Tf$_2$N] and the IL complex comprising [HHex][Tf$_2$N] chelated to 20% Cu displayed reduced cell viability by ~50% at the higher concentrations tested (FIG. 5). Experiments were repeated using an MTX assay with the trend in the results matching those of the LDH assay.

Example 4: Scarification Model in Mice

*P. aeruginosa* strain PAO1 was grown to an optical density 600 nm (OD$_{600}$) Of 1 in tryptic soy broth (TSB)

medium. Subsequently cells were washed twice with sterile PBS, and resuspended to a final concentration of $10^7$ CFU/50 µL.

To generate skin infection, female CD-1 mice (6 weeks old) were anesthetized with isoflurane. The fur on the back of the mice was removed through shaving. Superficial linear skin abrasions were made to damage only the stratum corneum and upper-layer of the epidermis but not the dermis. Five minutes after wounding, an aliquot of 50 µL suspension containing $10^7$ CFU of *P. aeruginosa* PAO1 in PBS was inoculated over each defined area containing the scratch with a pipette tip.

Two days later the pure IL ([HHex][Tf$_2$N]) in two different concentrations were inoculated within the same area. Animals were euthanized and the area of scarified skin was excised two and four days post-infection, homogenized using a bead beater for 15 minutes (20 Hz) and serially diluted for CFU quantification.

The CFU quantification was assessed by diluting the pure IL, in 10-fold dilution series in water, the solutions were platted in *Pseudomonas* Isolation Agar and incubated at 37° C. for 24 h. The colonies (CFU/mL) were counted visually and experiments were made in quadruplicates.

Example 5: Synthesis of Polymeric Analogues

Polymeric analogues comprising (4-vinyl)benzylethylenediamine (VBEDA) monomers were synthesized. Two solutions were prepared. One was a 4-vinylbenzyl chloride solution (solution-A), which was prepared by dissolving 10 mmol of 4-vinylbenzyl chloride (96%, mixture of meta and para isomers; Across Organic, USA) in 100 mL of dichloromethane. The other was an ethylenediamine solution (solution-B), which was prepared by dissolving 40 mmol of ethylenediamine in 200 mL of dichloromethane. Next, solution-A was slowly dropped into solution-B over 2 h, while stirring with a magnetic stirrer at 30° C. The stirring was continued for 1 d to ensure complete reaction. The dichloromethane was then removed using a rotary evaporator. The VBEDA was obtained as a residue. Subsequently, the VBEDA was dissolved in 200 mL of methanol, and then the solution was dropped into 1 L of diethyl ether to crystallize the VBEDA. Finally, the VBEDA crystals were collected by filtration, and dried under reduced pressure for about 1 h.

Polymerization occurred using AIBN, Azobisisobutyronitrile, at various concentrations to affect polymerization. With no co-monomer this compound was highly crosslinked. The AIBN concentration was 1 mol %. The mixture was stirred at 60° C. for 5 hours [19].

REFERENCES CITED

1) J. J. Harrison, H. Ceri, C. Stremick, R. J. Turner, *Environ. Microbiol.*, 2004, 6, 1220-1227
2) J. J. Harrison, H. Ceri, R. J. Turner, *Nat. Rev. Microbiol.*, 2007, 5, 928-938.
3) J. J. Harrison, R. J. Turner, D. A. Voo, M. A. Stan, C. S. Chan, N. D. Allan, H. A. Vrionis, M. E. Olson, H. Ceri, *Antimicrob. Agents Chemother.*, 2008, 52, 2870-2881.
4) H. H. Klasen., *Antimicrob. Chemother.*, 2007, 26, 117-130.
5) C. L. Fox Jr., *Arch. Surg.*, 1968, 96, 184-188.
6) C. G. Gemmell, D. I. Edwards, A. P. Fraise, F. K. Gould, G. L. Ridgeway, R. E. Warren, *J. Antimicrob. Chemother.*, 2006, 57, 589-608.
7) T. M. Hamill, B. F. Gilmore, D. S. Jones, S. P. Gorman, *Expert Rev. Med. Devices*, 2007, 4, 215-225.
8) B. F. Gilmore, G. P. Andrews, G. Borberly, M. J. Earle, M. A. Gilea, S. P. Gorman, A. F. Lowry, M. McLaughlin, K. R. Seddon, New J. Chem., 2013, 37, 873-876.
9) Antimicrobial System, EP 2293669 A2.
10) M. Iida, C. Baba, M. Onoue, H. Yoshida, E. Taguchi, H. Furusho, *Chem. Eur.* 1, 2008, 14, 5047-5056.
11) N. Silvestry-Rodriguez, K. R. Bright, D. C. Slack, D. R. Uhlmann, C. P. Gerba, *Appl. Environ. Microbiol.*, 2008, 74, 1639-1641.
12) S. Takeura, S. Kawakami, M. Harada, M. Iida, Solvation Structure of a Copper(II) Ion in Protic Ionic Liquids Comprising N-Hexylethylenediamine, *Inorg. Chem.*, 2014, 53, 9667-9678.
13) M. Iida, C. Baba, M. Inoue, H. Yoshida, E. Taguchi, H. Furusho, Ionic Liquids of Bis(alkylethylenediamine)silver(I) Salts and the Formation of Silver(0) Nanoparticles from the Ionic Liquid System, *Chem. Eur. J.*, 2008, 14, 5047-5056.
14) T. Pennanen, *Geoderma*, 2001, 100, 91-126.
15) F. Rojo, A. Dinamarca, Catabolite Repression and Physiological Control. *Pseudomonas*, 2005, 365-366.
16) J. Lederberg, et al., *Pseudomonas*. Encyclopedia of Microbiology. Second Edition, Vol. 3, San Diego, 2000, 876-891.
17) E. P. Skaar, The Battle for Iron between Bacterial Pathogens and Their Vertebrate Hosts, *PLoS Pathog.*, 2010, 6, e1000949.
18) C. Cox, Iron and the Virulence of *Pseudomonas aeruginosa*, Pseudomonas., 2004, 1-7.
19) S. Sakohara, Y. Kuriyama, K. Koboyashi, T. Gotoh, T. Iizawa, Adsorption and desorption of calcium ions by temperature swing with copolymer of thermosensitive and chelating components grafted on porous ethylene vinyl acetate disk, *Reactive & Functional Polymers*, 2013, 73, 1632-1638.
20) R. Kanazawa, T. Yoshida, T. Gotoh, S. Sakohara, Preparation of Molecular Imprinted Thermosensitive Gel Adsorbents and Adsorption/Desorption Properties of Heavy Metal Ions by Temperature Swing, *J. Chem. Eng. Japan*, 2004, 37, 59-66.
21) T. Ikeda, H. Yamaguchi, S. Tazuke, New polymeric biocides: synthesis and antibacterial activities of polycations with pendent biguanide groups, *Antimicrob. Agents Chemother.*, 1984, 26, 139-144

INCORPORATION BY REFERENCE

All US and PCT patent application publications and US patents cited herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

The invention claimed is:

1. A method of antimicrobial treatment, comprising:
providing a sample comprising a plurality of microorganisms;
adding to the sample an ionic liquid mixture comprising an ionic liquid complex comprising an ionic liquid chelated to a metal cation;
thereby killing or inhibiting the growth of at least a portion of the plurality of microorganisms in the sample,
wherein the ionic liquid comprises a cation and an anion; and
the cation is represented by the following structural formula I:

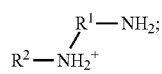
(I)

wherein, independently for each occurrence:
$R^1$ is $-(C(R)_2)_n-$;
n is 2, or 3;
$R^2$ is $-(C(R')_2)_m-R''$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R'' is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy,
or
the cation is represented by the following structural formula II:

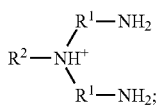
(II)

wherein, independently for each occurrence:
$R^1$ is $-(C(R)_2)_n-$;
n is 2, or 3;
$R^2$ is $-(C(R')_2)_m-R''$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R'' is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F $C_1$-$C_3$ alkyl, $C_1$-$C_3$ fluoroalkyl, $C_1$-$C_3$ alkyloxy, and $C_1$-$C_3$ fluoroalkyloxy.

2. A method of antimicrobial treatment, comprising:
providing a sample comprising a plurality of microorganisms, wherein said microorganisms comprise a metal cation;
adding to the sample an ionic liquid, thereby killing or inhibiting the growth of at least a portion of the plurality of microorganisms in the sample,
wherein the ionic liquid comprises a cation and an anion; and
the cation is represented by the following structural formula I:

(I)

wherein, independently for each occurrence:
$R^1$ is $-(C(R)_2)_n-$;
n is 2, or 3;
$R^2$ is $-(C(R')_2)_m-R''$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R'' is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy,
or
the cation is represented by the following structural formula II:

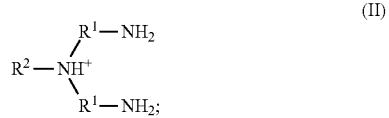
(II)

wherein, independently for each occurrence:
$R^1$ is $-(C(R)_2)_n-$;
n is 2, or 3;
$R^2$ is $-(C(R')_2)_m-R''$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R'' is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

3. A method of preventing or suppressing microbial growth on a surface, comprising:
applying to the surface an ionic liquid mixture comprising an ionic liquid complex comprising an ionic liquid chelated to a metal cation;
thereby preventing or suppressing microbial growth on the surface,
wherein the ionic liquid comprises a cation and an anion; and
the cation is represented by the following structural formula I:

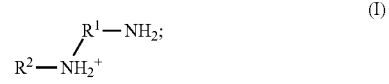
(I)

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy, or the cation is represented by the following structural formula II:

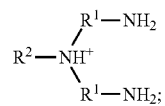

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

4. A method of preventing or suppressing microbial growth on a surface, comprising:
applying to the surface an ionic liquid, thereby preventing or suppressing microbial growth on the surface,
wherein the ionic liquid comprises a cation and an anion; and
the cation is represented by the following structural formula I:

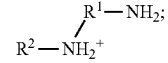

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy, or the cation is represented by the following structural formula II:

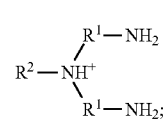

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

5. The method of claim 1, wherein the cation is represented by the following structural formula I:

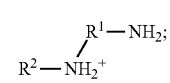

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

6. The method of claim 1, wherein the cation is represented by the following structural formula II:

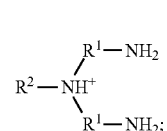

wherein, independently for each occurrence:
$R^1$ is —$(C(R)_2)_n$—;
n is 2, or 3;
$R^2$ is —$(C(R')_2)_m$—R";
m is 1, 2, 3, 4, 5, 6, 7, 8, 9, or 10; and
R is H, F, $C_1$-$C_3$ alkyl, or $C_1$-$C_3$ fluoroalkyl;

R' is H, F, $C_1$-$C_8$ alkyl, or $C_1$-$C_8$ fluoroalkyl; and

R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

7. The method of claim 2, wherein the cation is represented by the following structural formula I:

wherein, independently for each occurrence:
$R^1$ is $—(C(R)_2)_n—$;
n is 2, or 3;
$R^2$ is $—(C(R')_2)_m—R"$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

8. The method of claim 2, wherein the cation is represented by the following structural formula II:

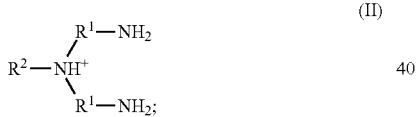

wherein, independently for each occurrence:
$R^1$ is $—(C(R)_2)_n—$;
n is 2, or 3;
$R^2$ is $—(C(R')_2)_m—R"$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

9. The method of claim 3, wherein the cation is represented by the following structural formula I:

wherein, independently for each occurrence:
$R^1$ is $—(C(R)_2)_n—$;
n is 2, or 3;
$R^2$ is $—(C(R')_2)_m—R"$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

10. The method of claim 3, wherein the cation is represented by the following structural formula II:

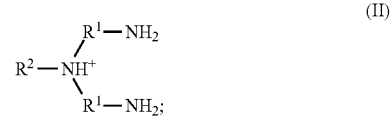

wherein, independently for each occurrence:
$R^1$ is $—(C(R)_2)_n—$;
n is 2, or 3;
$R^2$ is $—(C(R')_2)_m—R"$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

11. The method of claim 4, wherein the cation is represented by the following structural formula I:

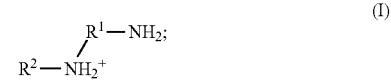

wherein, independently for each occurrence:
$R^1$ is $—(C(R)_2)_n—$;
n is 2, or 3;
$R^2$ is $—(C(R')_2)_m—R"$;
m is 1, 2, 3, 4, 5, 6, 7, 8, 9, or 10; and
R is H, F, $C_1$-$C_3$ alkyl, or $C_1$-$C_3$ fluoroalkyl;
R' is H, F, $C_1$-$C_8$ alkyl, or $C_1$-$C_8$ fluoroalkyl; and
R" is H, F, $C_1$-$C_3$ alkyl, $C_1$-$C_3$ fluoroalkyl, $C_1$-$C_3$ alkyloxy, $C_1$-$C_3$ fluoroalkyloxy, $C_6$-$C_{10}$ aryl, $C_2$-$C_8$ alkenyl or $C_2$-$C_8$ fluoroalkenyl; wherein each instance of $C_6$-$C_{10}$ aryl is optionally substituted with one, two, three, four or five substituents independently selected from the group consisting of F, $C_1$-$C_3$ alkyl, $C_1$-$C_3$ fluoroalkyl, $C_1$-$C_3$ alkyloxy, and $C_1$-$C_3$ fluoroalkyloxy.

12. The method of claim 4, wherein the cation is represented by the following structural formula II:

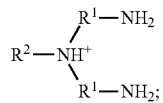 (II)

wherein, independently for each occurrence:
R$^1$ is —(C(R)$_2$)$_n$—;
n is 2, or 3;
R$^2$ is —(C(R')$_2$)$_m$—R";
m is 1, 2, 3, 4, 5, 6, 7, 8, 9, or 10; and
R is H, F, C$_1$-C$_3$ alkyl, or C$_1$-C$_3$ fluoroalkyl;
R' is H, F, C$_1$-C$_8$ alkyl, or C$_1$-C$_8$ fluoroalkyl; and
R" is H, F, C$_1$-C$_3$ alkyl, C$_1$-C$_3$ fluoroalkyl, C$_1$-C$_3$ alkyloxy, C$_1$-C$_3$ fluoroalkyloxy, C$_6$-C$_{10}$ aryl, C$_2$-C$_8$ alkenyl or C$_2$-C$_8$ fluoroalkenyl; wherein each instance of C$_6$-C$_{10}$ aryl is optionally substituted with one, two, three, four or five substituents independently selected from the group consisting of F, C$_1$-C$_3$ alkyl, C$_1$-C$_3$ fluoroalkyl, C$_1$-C$_3$ alkyloxy, and C$_1$-C$_3$ fluoroalkyloxy.

13. The method of claim 1, wherein the metal cation is a cation of Ag, Ca, Cu, or Zn.

14. The method of claim 1, wherein the anion is boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide.

15. The method of claim 2, wherein the metal cation is a cation of Mg, Fe, Hg, Sr, Sn, Ca, Cd, Zn, Co, Cu, Pb, Ni, Sc, V, Cr, Mn, La, Ce, Pr, Nd, Pm, Sm, Eu, Gd, Tb, Dy, Ho, Er, Tm, Yb, or Lu.

16. The method of claim 2, wherein the anion is boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide.

17. The method of claim 3, wherein the metal cation is a cation of Ag, Ca, Cu, or Zn.

18. The method of claim 3, wherein the anion is boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide.

19. The method of claim 4, wherein the anion is boron tetrafluoride, phosphorus hexafluoride, methanesulfonate, trifluoromethanesulfonate, benzenesulfonate, p-toluenesulfonate, bis(methanesulfonyl)amide, bis(trifluoromethanesulfonyl)amide, bis(benzenesulfonyl)amide, or bis(p-toluenesulfonyl)amide.

* * * * *